(12) United States Patent
Wang et al.

(10) Patent No.: US 11,811,868 B2
(45) Date of Patent: *Nov. 7, 2023

(54) NODE DATA TRANSMISSION METHOD (71) Applicant: DALIAN UNIVERSITY, Dalian (CN)

(72) Inventors: Zumin Wang, Dalian (CN); Leyu Liu, Dalian (CN); Zupeng Zheng, Dalian (CN); Jing Qin, Dalian (CN); Changqing Ji, Dalian (CN)

(73) Assignee: DALIAN UNIVERSITY, Dalian (CN)

( * ) Notice: Subject to any disclaimer, the term of this patent is extended or adjusted under 35 U.S.C. 154(b) by 201 days.

This patent is subject to a terminal disclaimer.

(21) Appl. No.: 17/425,429

(22) PCT Filed: Sep. 2, 2020

(86) PCT No.: PCT/CN2020/112998
§ 371 (c)(1),
(2) Date: Jul. 23, 2021

(87) PCT Pub. No.: WO2021/088489
PCT Pub. Date: May 14, 2021

(65) Prior Publication Data
US 2022/0103624 A1 Mar. 31, 2022

(30) Foreign Application Priority Data
Nov. 4, 2019 (CN) .......................... 201911065480.9

(51) Int. Cl.
*H04L 67/1095* (2022.01)
*H04L 67/568* (2022.01)
(Continued)

(52) U.S. Cl.
CPC ........ *H04L 67/1095* (2013.01); *H04J 3/0658* (2013.01); *H04L 67/568* (2022.05)

(58) Field of Classification Search
None
See application file for complete search history.

(56) References Cited

U.S. PATENT DOCUMENTS

| 11,619,747 B2* | 4/2023 | Wang | G01S 5/0027 |
| | | | 701/117 |
| 2007/0185660 A1* | 8/2007 | Anderson | G01D 21/00 |
| | | | 702/41 |

(Continued)

FOREIGN PATENT DOCUMENTS

| CN | 104850640 A | 8/2015 |
| CN | 109168193 A | 1/2019 |

(Continued)

OTHER PUBLICATIONS

International Search Report issued in corresponding International Application No. PCT/CN2020/112998, dated Nov. 30, 2020, China National Intellectual Administration, Beijing, China, 5 pgs.

(Continued)

*Primary Examiner* — Duc T Duong
(74) *Attorney, Agent, or Firm* — HAUPTMAN HAM, LLP (57) ABSTRACT

A node data transmission method, which pertains to the field of information technology, wherein in order to solve the problem of rationally processing the relationship between data collection and data transmission among multiple radio-frequency charged nodes, two neighboring nodes are synchronously awakened by a time synchronization method, and after the two neighboring nodes are time synchronized and awakened, the node determines data cache thereof and performs a corresponding node role conversion, and the effect thereof is reasonable use of the electricity.

3 Claims, 4 Drawing Sheets

(51) Int. Cl.
*H04L 43/02* (2022.01)
*H04L 43/08* (2022.01)
*H04W 84/18* (2009.01)
*H04J 3/06* (2006.01)

(56) References Cited

U.S. PATENT DOCUMENTS

| | | | | |
|---|---|---|---|---|
| 2013/0028143 | A1* | 1/2013 | Vasseur | H04W 40/30 370/256 |
| 2014/0365434 | A1* | 12/2014 | Chen | G06F 16/275 707/611 |
| 2017/0086022 | A1* | 3/2017 | Beattie, Jr. | H04W 8/08 |
| 2018/0263034 | A1* | 9/2018 | Nagakubo | H04W 24/10 |
| 2021/0250282 | A1* | 8/2021 | Gresset | H04L 45/02 |
| 2022/0286938 | A1* | 9/2022 | Wang | H04W 76/19 |

FOREIGN PATENT DOCUMENTS

| | | |
|---|---|---|
| CN | 109286953 A | 1/2019 |
| CN | 110839221 A | 2/2020 |

OTHER PUBLICATIONS

Written Opinion issued in corresponding International Application No. PCT/CN2020/112998, dated Nov. 30, 2020, China National Intellectual Administration, Beijing, China, 7 pgs.

First Office Action in corresponding Chinese Application No. 201911065480.9, dated Mar. 1, 2021, The State Intellectual Property Office of People's Republic of China, 10 pgs.

* cited by examiner

NODE DATA TRANSMISSION METHOD

RELATED APPLICATIONS

The present application is a U.S. National Phase of International Application Number PCT/CN2020/112998 filed Sep. 2, 2020 and claims priority to Chinese Application Number 201911065480.9 filed Nov. 4, 2019.

TECHNICAL FIELD

The present disclosure pertains to the field of information technology, and relates to a building-force-balance real-time monitoring system based on a passive sensor network.

BACKGROUND

In terms of building safety detection, X-ray method, eddy current method, and optical diagnostic method etc. were first commonly used in China, which determine the safety status of the overall building through detection of local buildings, but this kind of detection method has many shortcomings. With the development of information technology, optical fiber communication technology was used later to detect remote buildings. However, the use area and performance of this method were limited. After that, people began to install wireless sensors on bridge structures to detect health thereof. However, sensors are laid out throughout the bridge structure, which is feasible for a bridge structure that is relatively small, but for a large bridge structure, a large number of sensors need to be laid out. Nowadays, many researchers apply wireless sensors to buildings to detect the information of the buildings regularly, which improves the accuracy and integrity of the data as compared with some previous methods. However, the traditional wireless sensor is powered by a battery. Once the battery of the sensor is out of power, the sensor network cannot work. In addition, large amounts of human and material resources need to be consumed in subsequent battery replacement process, a large number of battery replacement also causes environmental waste, and long-term replacement also causes a lot of waste of funds.

SUMMARY

In order to solve the problem of rationally processing the relationship between data collection and data transmission among multiple radio-frequency charged nodes, the present invention proposes the following technical solution: a node data transmission method, wherein two neighboring nodes are synchronously awakened by a time synchronization method, and after the two neighboring nodes are time synchronized and awakened, the node determines the data cache thereof, if:

scenario I: the data cache of the node is less than a threshold, the node acts as a parent node role to collect data without transmitting data, and calculate whether its remaining energy can collect data and make the data cache greater than the threshold;

if the remaining energy is not sufficient to be maintained until the data cache is greater than the threshold, calculates the next synchronization wake-up time of the node and its neighboring child nodes, and enters sleep state when its energy is exhausted, and waits for the next time synchronization wake-up;

if the remaining energy is sufficient to be maintained until the data cache is greater than the threshold, the node calculates the next synchronization wake-up time of the node and its neighboring parent nodes, and if the data cache becomes greater than the threshold during the wake-up, the node is converted to a child node role to transfer the collected data without collecting data, and enters the sleep state when its energy is exhausted, waiting for the next time synchronization wake-up;

scenario II: the data cache of the node is greater than the threshold, the node acts as a child node role to transmit data without collecting data, and calculate whether its remaining energy can transmit data in the data cache until the data cache is less than the threshold;

if the remaining energy is not sufficient to be maintained until the data cache is less than the threshold, the node calculates the next synchronization wake-up time of the node and its neighboring parent nodes, and enters sleep state when its energy is exhausted, waiting for the next time synchronization wake-up;

if the remaining energy is sufficient to be maintained until the data cache is greater than the threshold, the node calculates the next synchronization wake-up time of the node and its neighboring child nodes, and if the data cache becomes less than the threshold during the wake-up, the node is converted to a parent node role to collect data without transmitting data, and enters the sleep state when its energy is exhausted, waiting for the next time synchronization wake-up.

Further, the time synchronization method is as follows: there are two situations between neighboring parent and child nodes: one is that the super-frame size of the child node is greater than that of the parent node; the other is that the super-frame size of the parent node is greater than that of the child node, and the adjustment method is to change the super-frame size in one node while keeping the super-frame size in the other node unchanged, to achieve time synchronization between the two nodes.

Further, a role conversion method is as follows: the node that sends the data is the child node, and the node that receives the data sends the data from a first node to a third node; the first node must forward the data to a second node, and the second node stores the data in a buffer, and then the second node transfers the data to the third node; as a continuous message flow, the data can only be transferred to one node at a time; the second node has two different roles during data transfer, the parent node and the child node; at first, the second node is the parent node role, which receives the data packet sent by the first node as the child node role; then, the second node switches its role to the child node, and forwards the data packet to the third node acting as the parent node role; during the above process, the second node conducts a role change, playing one of the two roles at different times according to specific conditions, and the role that the second node currently needs to play is determined according to the buffer size of the second node; when the buffer space in the second node is idle and can accept data from other nodes, the second node acts as the parent node role and receives data transmitted by its child nodes; when the buffer of the second node is full and cannot accept more data packets, the second node acts as the child node role, and the second node as the child node sends data to the parent node to free up the buffer space.

Advantageous effects: the present invention realizes data transmission between a node and another node of a lower or higher layer, and realizes rapid conversion of breakpoint transmission; during the transmission process, the data transmission between sensor nodes achieves time synchronization, which reduces the occurrence of loss in data transmission and collision between nodes.

1. Pressure sensing module, 2. data transmission rod, 3. pressure sensor module, 4. radio frequency signal acquisition module, 5. early warning indicator, 6. road node network, 7. bridge deck, 8. support node network, 9. support rod, 10. capacitor, 11. power cord, 12. intelligent pebble.

DETAILED DESCRIPTION

Example 1

A Building Force Balance Monitoring System Based on a Passive sensor network, comprising several nodes laid out in the same building surface of a building or in a supporting surface of a bridge, the nodes being mainly composed of a pressure sensor module, a radio frequency signal acquisition module, and a network module, wherein a sensing surface of the pressure sensing module collects pressure information of the building and transmits the same to the pressure sensor module, and the pressure sensor module receives electric energy provided by the radio frequency signal acquisition module, converts the pressure information into data, and uploads the data to the network through the network module; when the capacitance of the radio frequency signal acquisition module is less than a set threshold, the pressure sensor module enters a sleep state, and at this moment, the radio frequency signal acquisition module collects radio frequency signals and converts them into electrical energy; when the electrical energy storage reaches a high set threshold, the pressure sensor module is converted from the sleep state to an active state to perform data collection or transmission.

Further, the node has a pebble-shaped shell in which the respective modules are located, and the sensing surface of the pressure sensing module is a part or all of the top surface of the pebble shell.

Further, the pressure sensing module is connected with the pressure sensor module via a data transmission rod and performs signal transmission with the pressure sensor module.

Further, the building force balance monitoring system based on a passive sensor network implements a time synchronization method for data transmission between nodes, so that two neighboring nodes are woken up synchronously, and data can be transmitted between two neighboring nodes.

Further, the data transmission between two neighboring nodes uses a role conversion method.

As a preferable solution, which may also be an independent solution, a method for realizing data transmission between two neighboring nodes, a node data transmission method, wherein two neighboring nodes are synchronously awakened by a time synchronization method, and after the two neighboring nodes are time synchronized and awakened, the node determines the data cache thereof, if scenario I: the data cache of the node is less than a threshold, the node acts as a parent node role to collect data without transmitting data, and calculate whether its remaining energy can collect data and make the data cache greater than the threshold;

if the remaining energy is not sufficient to be maintained until the data cache is greater than the threshold, calculates the next synchronization wake-up time of the node and its neighboring child nodes, and enters sleep state when its energy is exhausted, and waits for the next time synchronization wake-up;

if the remaining energy is sufficient to be maintained until the data cache is greater than the threshold, the node calculates the next synchronization wake-up time of the node and its neighboring parent nodes, and if the data cache becomes greater than the threshold during the wake-up, the node is converted to a child node role to transfer the collected data without collecting data, and enters the sleep state when its energy is exhausted, waiting for the next time synchronization wake-up;

scenario II: the data cache of the node is greater than the threshold, the node acts as a child node role to transmit data without collecting data, and calculate whether its remaining energy can transmit data in the data cache until the data cache is less than the threshold;

if the remaining energy is not sufficient to be maintained until the data cache is less than the threshold, the node calculates the next synchronization wake-up time of the node and its neighboring parent nodes, and enters sleep state when its energy is exhausted, waiting for the next time synchronization wake-up;

if the remaining energy is sufficient to be maintained until the data cache is greater than the threshold, calculates the next synchronization wake-up time of the node and its neighboring child nodes, and if the data cache becomes less than the threshold during the wake-up, the node is converted to a parent node role to collect data without transmitting data, and enters the sleep state when its energy is exhausted, waiting for the next time synchronization wake-up.

As a preferable solution, which may also be an independent solution, time synchronization wakeup between two nodes is realized, namely, a time synchronization method: there are two situations between the neighboring parent and the child node: one is that the super-frame size of the child node is greater than that of the parent node; the other is that the super-frame size of the parent node is greater than that of the child node, and the adjustment method is to change the super-frame size in one node while keeping the super-frame size in the other node unchanged, to achieve time synchronization between the two nodes.

Further, a synchronization method for the first situation is as follows: when the charging rate of the child node is faster than that of the parent node, the size of child super-frame will be smaller than the size of parent super-frame, and a beacon message containing information about the super-frame time of the parent node will be received from the parent node, to determine the start time of the next frame of the parent node. When the beacon information is received, the child node uses the beacon information to adjust its super-frame so that its frame start time is aligned with the start time of the parent node, and a duty cycle is added to the end of the child super-frame to expand it. In this extended duty cycle, the child node wakes up and starts to consume predetermined energy, then goes back to the sleep state and starts charging again, so that the energy at the beginning of the duty cycle is equal to the energy at the end of the cycle, the size of the super-frame of the parent is equal to that of the child nodes, and the nodes are time synchronized.

Figure 3:
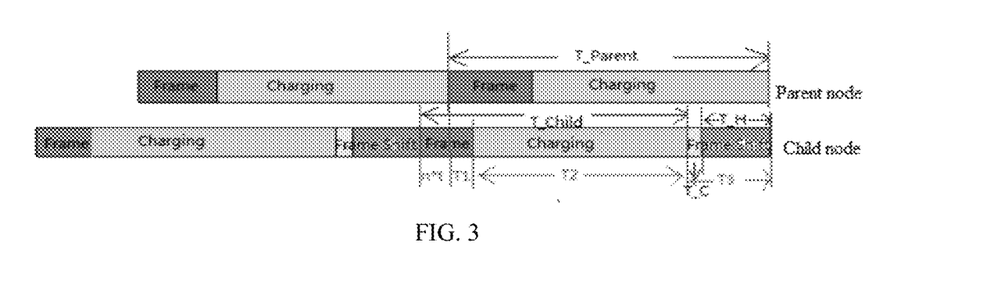
FIG. 3 is a schematic diagram of super-frame extension.

Further, a method for calculating the time when the child node wakes up and starts to consume the predetermined energy is as follows: before the child node receives the beacon message, n*t time has been passed in the frame, TC is the time spent on energy consumption. The calculation method of Tc is as follows: T1 is the remaining time in the current frame, T2 is the sleep time in the duty cycle, T3 is the time occupied by the secondary duty cycle, T3 is the sum time Tc and Th, Tc is the time taken to consume some energy, Th is the time taken to collect this energy, and the time Tparent taken by the parent node to start the next frame is the sum of T1, T2 and T3, namely, $$T1 + T2 + T3 = Tparent \qquad \text{Formula (1)}$$

then: $T1 + T2 + Tc + Th = Tparent$

The energy consumed during the secondary duty cycle or adjustment time must be equal to the energy harvested during the same duty cycle, namely, $$Ec = Eh, \qquad \text{Formula (2)}$$
$$Tc * Rc = Th * Rh$$
$$Th = \frac{Tc * Rc}{Rh}$$

Formula (1) is substituted into Th, to obtain:

$$T1 + T2 + Tc + \frac{Tc * Rc}{Rh} = Tparent \qquad \text{Formula (3)}$$

The total time the child node spends in the current super-frame is equal to the sum of the time the child node has spent, the time remaining in the current awake state, and the time required for full charge of the child node:

$$T1 + T2 + (n*t) = Tchild \qquad \text{Formula (4)}$$

Formula (3) is substituted into formula (4), to obtain:

$$Tchild - (n*t) + Tc + \frac{Tc * Rc}{Rh} = Tparent$$

$$Tc * \left\{1 + \frac{Rc}{Rh}\right\} = Tparent - Tchild + (n*t)$$

$$Tc * \left\{\frac{Rh + Rc}{Rh}\right\} = Tparent - Tchild + (n*t)$$

After organization, we obtain:

$$Tc = \frac{Tparent - Tchild + (n*t)}{Rh + Rc} * Rh \qquad \text{Formula (5)}$$

Further, a synchronization method for the second situation is as follows: when the charging rate of the child node is slower than that of the parent node, the size of child super-frame will be larger than the size of parent super-frame, and when the beacon information is received, the child node has passed n*t time of the frame and left some energy. It is calculated how long the child node should continue in the current frame before it can align itself to the parent node. By shrinking its own duty cycle, the child node aligns with the parent node.

Figure 4:
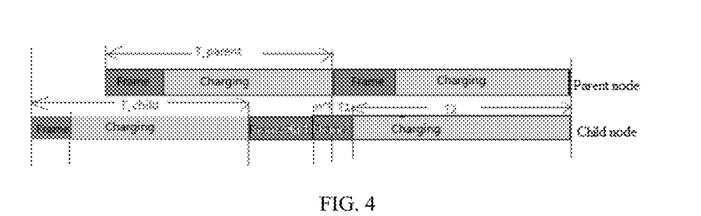
FIG. 4 is a schematic diagram of super-frame reduction.

Further, a method for calculating how long the child node should continue in the current frame before aligning itself to the parent node is as follows: T1 is the time for the child node to continue the current frame and consume energy, T2 is the time required for full charge of the child node, and the calculation method of T1 is as follows:

$$T1 + T2 = Tparent \qquad \text{Formula (6)}$$

When a beacon message is received from the parent node, the remaining energy in the child node is calculated from the energy it has consumed in the current frame, which is expressed by the following formula:

$$Eleft = Efull - (n*t) * Rc \qquad \text{Formula (7)}$$

The sum of the energy consumed and harvested by the child node and the remaining energy of the child node must be equal to the total charge, namely:

$$Efull = Eleft - (T1 * Rc1) + (T2 * Rh1) \qquad \text{Formula (8)}$$

Formula (7) is substituted, to obtain $$Efull = \{Efull - (n*t) * Rc\} - (T1 * Rc1) + (T2 * Rh1)$$
$$T1 * Rc1 = (T2 * Rh1) - ((n*t) * Rc)$$

Formula (6) is substituted, to obtain $$T1 * Rc1 = \{(Tparent - T1) * Rh1\} - ((n*t) * Rc)\quad \text{Formula (9)}$$

$$T1 * \{Rc1 + Rh1\} = (Tparent * Rh1) - ((n*t) * Rc)$$

$$T1 = \frac{\{(Tparent * Rh1) - ((n*t) * Rc)\}}{Rc1 + Rh1}.$$

In this formula, n is the operating cycle, t is the time of each cycle, Ec is the consumed energy, Eh is the harvested energy, Rh is the energy collection rate, Rc is the energy consumption rate, Eleft is the remaining energy, Efull is the total energy, Tchild is the total time the child node spends in the current super-frame, Rc1 is the energy consumption rate of the child node continuing the current frame, and Rh1 is the energy collection rate of the child node continuing the current frame.

As a preferable solution, which may also be an independent solution, role conversion of the node can be realized, and data transmission can be resumed when the role is switched and returned to the original role:

the node that sends the data is the child node, and the node that receives the data sends the data from a first node to a third node; the first node must forward the data to a second node, and the second node stores the data in a buffer, and then the second node transfers the data to the third node; as a continuous message flow, the data can only be transferred to one node at a time; the second node has two different roles during data transfer, the parent node and the child node;

at first, the second node is the parent node role, which receives the data packet sent by the first node as the child node role;

then, the second node switches its role to the child node, and forwards the data packet to the third node acting as the parent node role;

during the above process, the second node conducts a role change, playing one of the two roles at different times according to specific conditions, and the role that the second node currently needs to play is determined according to the buffer size of the second node;

when the buffer space in the second node is idle and can accept data from other nodes, the second node acts as the parent node role and receives data transmitted by its child nodes; when the buffer of the second node is full and cannot accept more data packets, the second node acts as the child node role, and the second node as the child node sends data to the parent node to free up the buffer space.

Further, when the buffer of the second node reaches 80% of the full capacity, the second node switches from the role of the parent node to the role of the child node; when the buffer of the second node reaches 10% of the full capacity, the second node switches from the child role to the parent role.

Figure 5A:
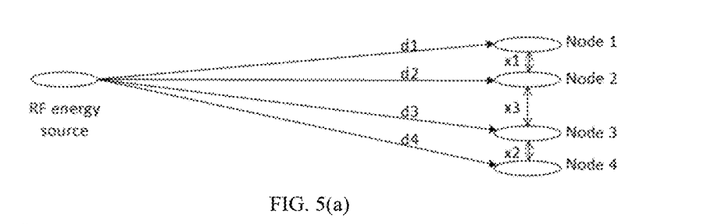
FIGS. 5(a) and 5(b) are schematic diagrams of the role conversion mechanism, wherein 5(a) is a data transmission diagram, and 5(b) is a role switching diagram performed by a node during a continuous work cycle.
Figure 5B:
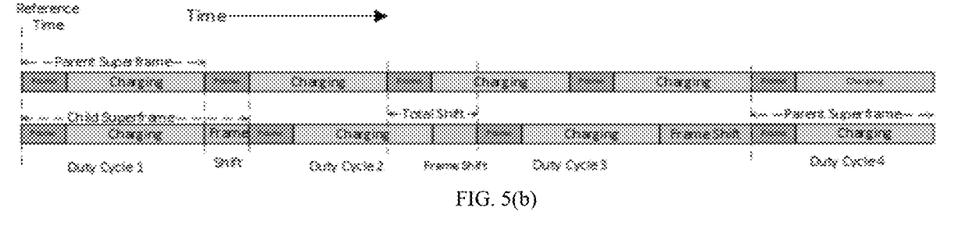

Further, when acting as a parent node, a node fixes a reference point in the time dimension. After the node is converted from a parent node to a child node, the original child node of the node may still be waiting to communicate with it. The node needs to record its frame shift, readjust itself back to its reference point, to switch back to the role of the original parent node and communicate with the original child node again; a method to calculate the frame shift is:

Shift = Minimum Duty Cycle Time − Total Frame Shifts

Shift is the shift of the movement when the child node is converted to the parent node, Minimum Duty Cycle Time is the minimum duty cycle, and Total Frame Shifts is the total adjustment time.

As a preferable solution, which may also be an independent solution, a synchronous transmission method of pressure collection data of multi-node distributed building, which comprises the following steps:

S1. laying nodes in a building, and constructing a network route;

S2. acquiring the state and energy usage information of each node, realizing time synchronization for two neighboring nodes, and transmitting data through role switching.

Further, the method of laying nodes is as follows: the nodes are laid out in the same building surface of the building or in multiple areas within the supporting surface of a bridge, and the nodes laid out in the same area are equalized with the same distance between neighboring nodes; the supporting surface of the bridge includes the supporting surface of the bridge support and the bridge span road, and more nodes are distributed on the supporting surface of the bridge support; for an area where nodes are laid out, there is an area where nodes are laid out symmetrically, and the node layout surfaces are symmetrical as a whole, so that data comparison can be performed on whether the symmetrical areas are pressure balanced.

Figure 7A:
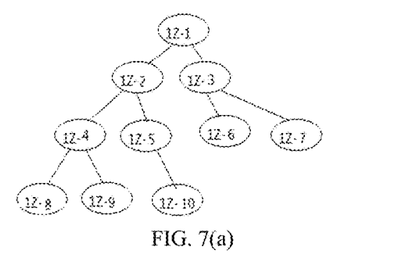
FIGS. 7(a)-7(d) are tree network topology routing diagrams, wherein 7(a) is a support network routing diagram, 7(b) a road network routing diagram, 7(c) a bridge total network routing diagram, 7(d) a total network routing diagram.
Figure 7B:
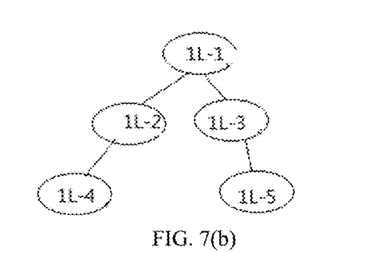
Figure 7C:
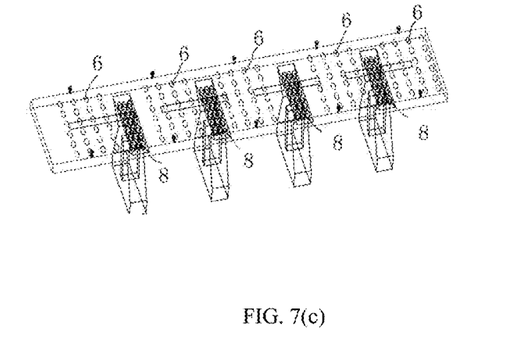
Figure 7D:
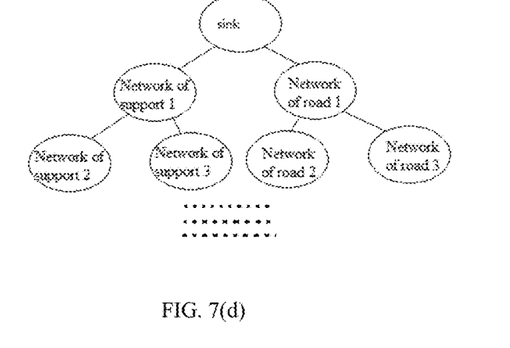

Further, a method of constructing a tree network route for a bridge is as follows: for a route composed of nodes of the bridge support, the name of each node thereon is composed of support number-support code-node number; the bridge has multiple bridge supports, and for a route composed of road nodes between every two neighboring supports, the name of each node thereon is composed of road number-road code-node number; all the supports and all the roads form a large network as shown in the figure to form a total route.

Further, the force of the entire bridge is analyzed based on the data transmitted by the network of each bridge support and road, and the node transmits the data to a management platform through the route according to the established network route.

Further, the data is transmitted to the network route by a node in a certain network, and then is further transmitted through a parent route on the routing network and is continuously transmitted upwards, and finally transmitted to the management platform via a sink node and the Internet, for force analysis.

Further, the state of each node is acquired, the state includes sleep/wake state and energy use state. After forming a network, the nodes need to know information of neighboring nodes and acquire the information by sending information signals. The operation of the node is carried out in the awake state. The nodes in the network have their own data transmission slot numbers, and each operating cycle will be allocated according to hop counts of the route to perform node data transmission.

Further, the node data transmission method is as follows: first, a node collects force information and saves the force information in a local buffer, and senses the synchronization period of neighbor nodes; through time synchronization, according to the data size of the node and the distance between neighboring nodes, it is determined whether the remaining energy of the current node can meet its energy demand for processing data, and the role conversion method is used according to whether the data in the buffer reaches a threshold, to perform node data transmission. The specific transmission method of the node data transmission method is the node data transmission method in the foregoing Example.

Further, a step S3, early warning and alarm after the force analysis of the bridge, is further comprised, wherein an early warning indicator system is installed at the entrances of both ends of the bridge and on both sides of each section of the road, which is mainly composed of an early warning indicator; the radio frequency signal acquisition module collects radio frequency signals, converts them into electric energy, and connects with the capacitor through the power line to store the electric energy in the capacitor; when it is detected that the capacity of the capacitor is lower than a certain storage amount, the node will perform energy collection, and when it is detected that the capacity of the capacitor is full, the node will enter a dormant state and no longer collect radio frequency signals; the purpose is that since the early warning indicator needs a stable and longer power supply, the radio frequency power is stored and supplied, which can improve the stability of power supply, while it is instantaneous for the pressure sensor to collect and transmit data, and real-time supply can meet its needs. Meanwhile, the early warning indicator system receives an analysis result given by the management platform and warning information of the road network. If the part of the road is overloaded, a light alarm is issued. The early warning indicator is supported by a support rod, and the early warning indicator system and the capacitor are connected through a power cord, the support rod is connected to the shell in which the capacitor is installed, and the shell supports the bottom.

Further, the early warning includes:

Support early warning: first, nodes (intelligent pebbles may be selected) at both ends of the same support carry out force collection, and determine whether the load bearing is overloaded by comparing the collected force and the pressure that the support can withstand; if the force is overloaded, an overload warning will be uploaded to a management terminal, and meanwhile the early warning indicators at both ends of the support will turn yellow; if the force continues to be overloaded, the early warning indicator will turn red, and the data will be uploaded to the management terminal for processing; if the other supports are balanced (within a normal range), the green light will be on.

Road early warning: data on the same section of road is detected, if there is an overload on one side of the road or in a certain area, the early warning indicators at both ends of the road will turn yellow, and if the force continues to be overloaded, the early warning indicators will turn red, and the data will be uploaded to the management terminal for processing.

Early warning at both ends of the bridge: if a certain section of the support or road network has a continuous force overload, the early warning indicators at both ends of the bridge will turn red, and according to the early warning lights, the driver can know that the bridge is overloaded and then prohibit driving into the bridge, so as to avoid the danger of bridge damage caused by force overload.

Further, collected data can be used to predict the use of the bridge. The data uploaded by each support network and road network are saved, and analyzed with big data technology, to obtain a diagram of force changes of the bridge, which can predict the service life of the bridge. In this way, dangerous accidents caused by bridges that have exceeded their service life can be prevented in advance.

Figure 9:
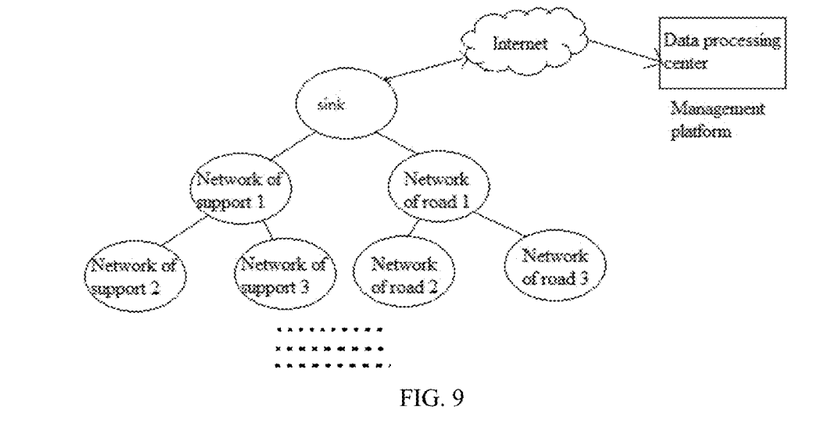
FIG. 9 is a flow chart of the node information transmission.

In the present invention, the method of using intelligent pebble network to monitor the force balance of a building in real time can monitor the force status and safety status of the building in real time. According to the collected force information, it is determined whether the current building is in a normal safe status. If the force is unbalanced, that is, the side force is so large that it exceeds the bearing range, an alarm will be issued, and treatment will be made in time, as shown in FIG. 9. By using the intelligent pebble, the waste of energy and resources is reduced, and the life cycle of the sensor is increased. When this method is used in housing construction and bridge construction, it will greatly increase the safety of the building.

The present disclosure makes a passive pressure sensor as an "intelligent pebble" and embeds it in the building to perform real-time monitoring on the force of each building support interface in building construction and bridge construction. When the force of a certain area of the building is seriously beyond the force range, the system can immediately issue an alarm and make the early warning indicator flash to give a warning. Real-time monitoring of the force of main support interface of the building is realized, and meanwhile the waste of battery energy of the sensor is reduced, and the quality and safety of the building are effectively improved. Moreover, it is possible to carry out all-weather monitoring without blind spots. Limitations of the existing sensors used in buildings are overcome.

The present disclosure makes use of data transmission of a passive sensor and a passive sensor network, and provides energy for the sensor by acquiring radio frequency signals in the environment and converting them into electrical energy, which reduces the waste of funds. The use of this method can make the sensor work all the time and increase the life cycle of the sensor network. The intelligent pebble can be embedded in the building with its shape, more realistically detect the force of the building, and monitor the safety status of the building in real time.

The pressure sensor is also called a load cell. The intelligent pebble network composed of a large number of passive pressure sensors, which is highly sensitive to pressure, can collect the overall force information of buildings or bridges, and provide data for the detection of construction safety of buildings or housing quality or for prediction of the service life of buildings. The intelligent pebble collects data in an active state and collects energy in a sleep state. The intelligent pebble network can continue to work. Its huge data collection and detection potential make it have great application prospects in detecting the overall force information of a bridge structure or the safety information of a building. Besides, as compared with traditional battery sensors, the use of passive sensor modules reduces the battery replacement and consumption, and reduces maintenance costs. The hardware technology principle on which the present invention is based is mainly the communication technology of the sensor network. The application innovation of the present invention is mainly embodied in that the intelligent pebble is embedded in the force interface of the building to collect force data, and in the data transmission technology in the intelligent pebble network.

However, it is difficult for the data transmission between sensor nodes to achieve time synchronization, because the respective nodes are different in data collection rate, energy collection rate, and energy collection time. Therefore, problems such as loss in data transmission and collisions between nodes are prone to occur. In order to solve the aforesaid problems in the network, the present invention proposes a time synchronization mechanism and a role conversion technology to realize data transmission between sensor nodes and improve the accuracy of data transmission.

Example 2

Figure 1:
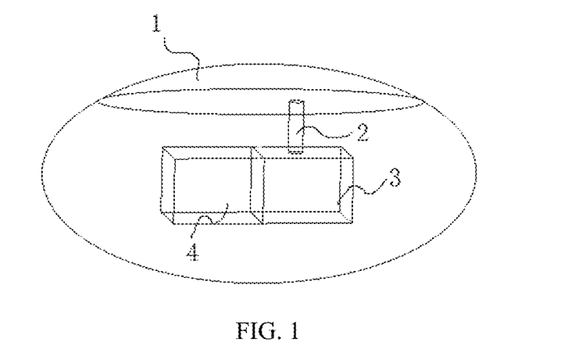
FIG. 1 is a schematic diagram of the structure of a building force balance monitoring system based on a passive sensor network.

FIG. 1 is a structure diagram of an intelligent pebble, which is composed of a pressure sensing module, a data transmission rod, a radio frequency signal acquisition module, and a pressure sensor module. The pressure sensor module senses pressure information and transmits it to the pressure sensor module through the data transmission rod. The pressure sensor module uses electric energy provided by the radio frequency signal acquisition module to convert and analyze the pressure information into data, and upload the data to the routing network for processing through a built-in antenna. When the electric capacity is less than a certain threshold, the radio frequency signal acquisition module enters a sleep state to collect radio frequency signals and convert them into electric energy, and when the electric energy storage reaches a high threshold, the radio frequency signal acquisition module converts from the sleep state to an active state to perform data collection.

The following is the core algorithm contents of the present invention.

The First Algorithm, Time Synchronization Mechanism:

divide time into slot, frame, adjustment time and superframe. Each frame contains multiple slots, and each slot can perform transmission and reception independently. The problem of inability to transmit data due to time non-synchronization between neighboring nodes is solved by changing the size of the super-frame in one node while keeping the size unchanged in the other node. There are usually two situations between neighboring parent and child nodes: one is that the super-frame size of the child node is larger than that of the parent node, and the other one is that the super-frame size of the parent node is larger than that of the child node.

Figure 2A:
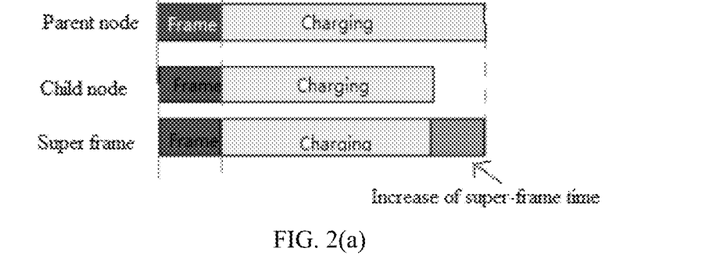
FIGS. 2(a) and 2(b) are schematic diagrams of super-frame adjustment, wherein 2(a) is frame adjustment when the charging rate of the child node is greater than that of the parent node, and 2(b) is frame adjustment when the charging rate of the child node is less than that of the parent node.
Figure 2B:
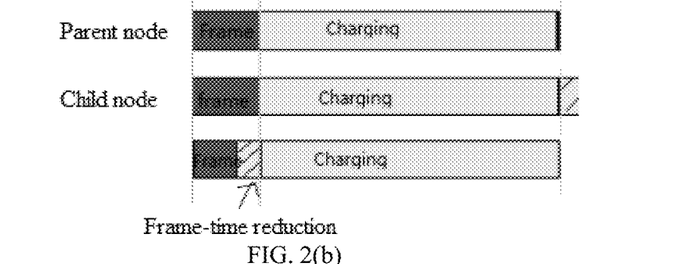

For the first situation, as shown in FIG. 2(a), when the charging rate of the child node is faster than that of the parent node, the size of the child super-frame will be smaller than the size of the parent super-frame. In this case, we will add another small duty cycle to the end of the current super-frame to expand it. Within this expanded duty cycle, the child node will wake up and start consuming predetermined energy, and then return Sleep state and start charging again. It is ensured that the energy at the beginning of the duty cycle is equal to the energy at the end, so that it can be ensured that the super-frames between the parent and child nodes are equal in size, and the nodes can ensure time synchronization.

Specific method: the child node receives a beacon message from the parent node, which contains information about the super-frame time of the parent node and can be used to determine the start time of the next frame of the parent node. Now, the child node uses this information and checks how it adjusts the super-frame of the child node so that the frame start time of the child node is aligned with the start time of the parent node. If the super-frame size of the parent node is larger than its own super-frame, then the child node decides to expand its super-frame. As shown in FIG. 3, before the child node receives the beacon message, n*t time has been passed in the frame. T1 is the remaining time in the current frame, and T2 is the sleep time in the duty cycle. T3 is the time occupied by the secondary duty cycle. T3 is divided into Tc and Th, wherein Tc is the time taken to consume some energy, and Th is the time taken to collect the energy. We need to calculate the time Tc that the child node takes to consume energy.

Formulae are derived as follows.

Time T3 is the sum of time Tc and Th, and the time Tparent taken by the parent node to start the next frame is the sum of T1, T2, and T3, namely:

$$T1 + T2 + T3 = Tparent \qquad \text{Formula 1}$$

$$T1 + T2 + Tc + Th = Tparent$$

The energy consumed during the secondary duty cycle or adjustment time must be equal to the energy harvested during the same duty cycle, namely, $$Ec = Eh, \; Tc * Rc = Th * Rh \qquad \text{Formula 2}$$

$$Th = \frac{Tc * Rc}{Rh}$$

Formula 1 is substituted into Th, to obtain:

$$T1 + T2 + Tc + \frac{Tc * Rc}{Rh} = Tparent \qquad \text{Formula 3}$$

The total time the child node spends in the current super-frame is equal to the sum of the time the child node has spent, the time remaining in the current awake state, and the time required for full charge of the child node:

$$T1 + T2 + (n * t) = Tchild \qquad \text{Formula 4}$$

Formula 3 is substituted into formula 4, to obtain:

$$Tchild - (n * t) + Tc + \frac{Tc * Rc}{Rh} = Tparent$$

$$Tc * \left\{1 + \frac{Rc}{Rh}\right\} = Tparent - Tchild + (n * t)$$

$$Tc * \left\{\frac{Rh + Rc}{Rh}\right\} = Tparent - Tchild + (n * t)$$

After organization, we finally get:

$$Tc = \frac{Tparent - Tchild + (n * t)}{Rh + Rc} * Rh \qquad \text{Formula 5}$$

By using Formula 5, the child node can expand its super-frame to align with the parent node.

For the second situation, as shown in FIG. 1(b), when the size of the child super-frame is larger than the size of the parent super-frame, the frame size needs to be reduced to achieve synchronization between nodes. The specific approach is as follows: in order to align itself with the parent node, the child node needs to shrink its own duty cycle, as shown in FIG. 4. When receiving the beacon information, a child node has passed n*t time of the frame and left a certain amount of energy. After the energy is left, the child node needs to calculate how long it should continue in the current frame to align itself to the parent node. T1 is the time for the child node to continue the current frame and consume energy, and T2 is the time required for full charge of the child node.

The derivation formula of T1 is as follows:
From FIG. 4, it is known:

$$T1 + T2 = Tparent \qquad \text{Formula 6}$$

When a beacon message is received from the parent node, the remaining energy (ELeft) in the child node can be calculated from the energy it has consumed in the current frame. This can be expressed by the following formula:

$$Eleft = Efull - (n*t)*Rc \qquad \text{Formula 7}$$

The sum of the energy consumed and harvested by the child node and the remaining energy of the child node must be equal to the total charge, namely:

$$Efull = Eleft - (T1*Rc1) + (T2*Rh1) \qquad \text{Formula 8}$$

Formula 7 is substituted, to obtain $$Efull = \{Efull - (n*t)*Rc\} - (T1*Rc1) + (T2*Rh1)$$
$$T1*Rc1 = (T2*Rh1) - ((n*t)*Rc)$$

Formula 6 is substituted, to obtain $$T1*Rc1 = \{(Tparent - T1)*Rh1\} - ((n*t)*Rc) \qquad \text{Formula (9)}$$
$$T1*\{Rc1 + Rh1\} = (Tparent*Rh1) - ((n*t)*Rc)$$
$$T1 = \frac{\{(Tparent*Rh1) - ((n*t)*Rc)\}}{Rc1 + Rh1}.$$

By using Formula 9, the child node can shrink its super-frame to align with the parent node.

In this formula, n is the operating cycle, t is the time of each cycle, Ec is the consumed energy, Eh is the harvested energy, Rh is the energy collection rate, Rc is the energy consumption rate, Eleft is the remaining energy, Efull is the total energy, Tchild is the total time the child node spends in the current super-frame, Rc1 is the energy consumption rate of the child node continuing the current frame, and Rh1 is the energy collection rate of the child node continuing the current frame.

The Second Algorithm, Role Conversion Mechanism:

The role conversion mechanism is an important improvement, wherein a node can simultaneously transmit data with nodes in a lower or higher layer. As shown in FIG. 5(a) below, in order to send data from node 4 to node 2, node 4 must forward the data to node 3. Node 3 stores the data in a buffer area and then passes it to node 2. This is a continuous message flow, and the message can be delivered to one node at a time. Therefore, the node must play two different roles, namely a parent node and a child node. First, node 3 acts as the parent node and accepts a data packet from node 4, then switches its role to the child node and forwards the data packet to node 2. In our method, a node can play either of the two roles according to specific conditions. The buffer size of the node is used to determine the role the node needs to play. When the buffer space in the node is free and can accept data from another node, the node acts as a parent. Likewise, when the buffer area of the node is full and cannot accept more data packets, the node will act as a child node. At this time, the child node needs to send data to the parent node to release the buffer space. A threshold for switching from the parent role to the child role is 80% of the full capacity, and a threshold for switching from the child role to the parent role is 10% of the full capacity. The upper threshold is set to reserve a certain buffer to receive sensory data of the node, and the lower threshold is set to maximize the data transmission.

Specific conversion is as follows:

FIG. 5(b) shows an example of a node completing role switching in four work cycles. At the beginning, the node fixes a reference point in the time dimension when acting as a parent node. The duty cycle shown in the first row is only for reference to demonstrate the shift of the duty cycle due to the frame shift. The duty cycle shown in the second raw is the actual duty cycle used by the node. After the node is converted into a child node, its original child node may still be waiting to communicate with it. At this time, the node needs to record how much its frame has moved so as to facilitate the conversion to the state of the original parent node and communicate with the original child node. In the first two work cycles in the figure below, the node is in the child node state, carries out two-frame shift to search for the parent node. Then in task cycle 3, the child node is ready to switch to the parent role. Now the node needs to calculate the frame shift it needs in order to readjust itself back to its reference point. The frame shift is given by Formula 10:

$$\text{Shift=Minimum Duty Cycle Time-Total Frame Shifts} \qquad \text{Formula 10}$$

Shift is the displacement of the movement when the child node is converted to the parent node, Minimum Duty Cycle Time is the minimum work cycle, and Total Frame Shifts is the total adjustment time;

---

Algorithm pseudo codes:
initialize E0=0, T=1, En=0, H=0, Et={ }
set: z (force of the building), Eh (power capacity of a node)
1: loop
2: obtain the energy E(t) at time t
3: if E(t)>Eh
4:             collect data
5: else
6:             continue to collect energy
7: end if

```
    8:  acquire time information of neighbor node
    9:  calculate the time difference tc
   10:      compute the secondary duty cycle information of the node (Formula 5,
Formula 9)
   11:      loop:
   12:          transfer node data (role conversion)
   13:      if Ht>z
   14:                          detect unbalanced force, and issue an alarm
   15:                      let H=0
   16:                          collect force data again
   17:      else
   18:                          add E(t) to Et
   19:      end if
   20:                      t=t+1
   21:      end loop
   22:      end loop
```

For the above-mentioned intelligent pebble, which serves as a monitoring system, the method used for monitoring in a building is divided into three steps in total: node layout and the design of network routing in the building, the time synchronization and data transmission of the intelligent pebble node, and the pressure detection automatic alarm mechanism. The design of the aforesaid structure effectively solves the wiring problem in traditional wired sensors and the battery waste problem in wireless sensor networks. By embedding an intelligent pebble, a real-time force situation of the overall bridge can be detected more realistically, so that bad events (unbalanced force or bridge damage) can be predicted, and emergencies can be dealt with in time to avoid accidents.

Figure 6A:
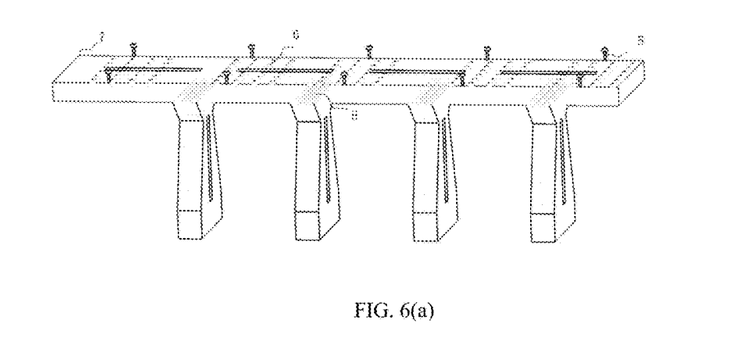
FIGS. 6(a)-6(c) are node layout diagrams, wherein 6(a) is a diagram showing a partial structure of a bridge, 6(b) is a support network layout diagram, and 6(c) is a road network layout diagram.
Figure 6B:
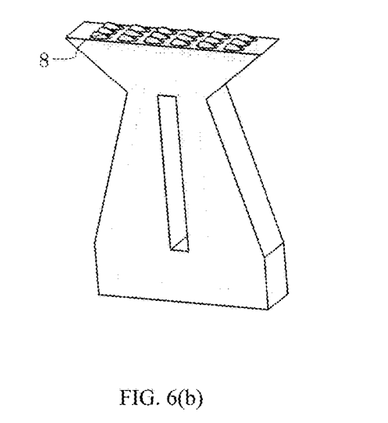
Figure 6C:
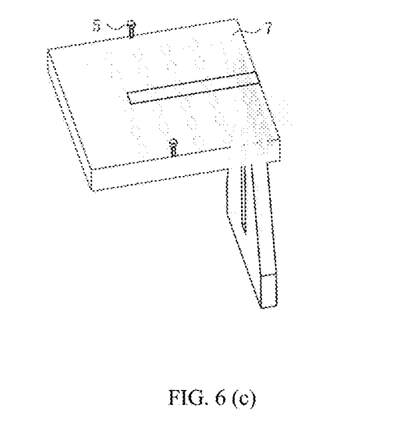

Step 1: Node Layout and Design of Network Routing in a Building 1.1 Node layout: in this part, it is necessary to lay out intelligent pebble nodes in the same building surface of the building. The nodes may be embedded in the building, or the intelligent pebble may be embedded in a supporting surface of the bridge, and the nodes are laid out evenly so that a certain distance is kept between neighboring nodes. For example, FIG. 6($a$) is a part of the structure of the bridge, (b) shows an intelligent pebble layout of a support in a bridge, and (c) shows an intelligent pebble layout of a road in the bridge, the intelligent pebble mainly detects the force of the bridge support and the road part across the bridge. The bridge support is the main support point, and more intelligent pebble nodes will be distributed on the bridge support to obtain the force of the support. The bridge support is divided into left and right parts, and as shown in FIG. 6($b$), the same number of intelligent pebbles are allocated to both the left and right parts. By analyzing the force of the two parts, it is determined whether the force is balanced. The same number of intelligent pebbles are equally allocated to the road parts across the bridge, which, like the support, are also divided into the left and right parts; In the later data collection, the force of the two parts will be collected to compare the force of the symmetrical positions of the left and right parts and compare the force of each node to analyze whether the force of the bridge is balanced.

1.2 Generation of network route: After the node layout is completed, the intelligent pebble node needs to collect radio frequency signals to store energy. After the node energy storage is completed, the node location technology is used to locate the node, and then a tree network route is constructed. The data transmission process of the intelligent pebble is similar to a tree structure, which transmits data from the child node to the parent node, and the parent node transmits the data to the management platform, and the tree route is easy to expand. As shown in FIG. 7($a$), this is a route composed of intelligent pebble nodes of a support. Each node is composed of support number-support code-node number, so that it can be distinguished which route of which support this network is. If it is necessary to add more routes, nodes can be added to the child nodes of the routing network, which is easier to expand. As shown in FIG. 7($b$), this is a route composed of intelligent pebble nodes on a road. A bridge is supported by many supports, there is a section of road between every two supports, and this section of road forms an intelligent pebble network. A route is established and composed of the road number-road code-node number, so that it can be clearly distinguished where the road is located on the bridge, and its location can be quickly found when a force warning occurs. Finally, all the supports and all the roads form a large network as shown in FIG. 7($c$), and finally a total route is formed, as shown in FIG. 7($d$). The force of the entire bridge is analyzed through the data transmitted by each network. According to the established network route, the node transmits the data to the administrator via the route. For example, as shown in FIG. 7, the node in a certain network transmits the data to the network route, and then the data is transmitted through a parent route on the route network, and it is always transmitted upwards. Finally, the data is transmitted to the management platform through a sink node and the Internet, and the management platform makes processing according to the data information.

Step 2:

In this part, the state of each node, i.e., sleep/wake-up state and energy usage information, is acquired first. After forming a network, nodes need to know the information of neighboring nodes and acquire it by sending information signals. The operation of the nodes is carried out in the wake-up state. The nodes in the network have their own data transmission slot numbers, and each operation cycle will be allocated according to hop counts of the route. First, the intelligent pebble node collects the force information of a building, and then saves it in a local buffer to sense the synchronization period of the neighbor nodes, and time synchronization is carried out in accordance with Formula 5 and Formula 9, and then it is determined whether the energy consumed is greater than the remaining energy of the node according to the data size of the node and the distance between the neighbor nodes. Then the node uses the role conversion mechanism to transmit data according to the size of the buffer area.

Figure 8:
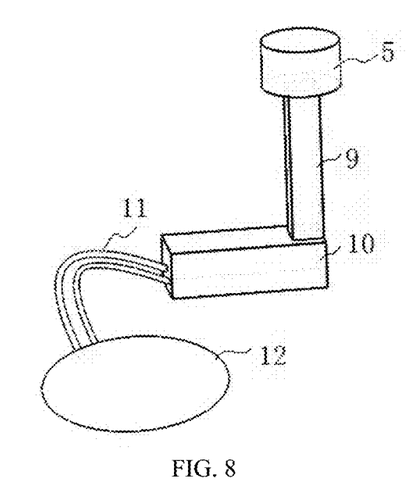
FIG. 8 is a schematic diagram of the structure of an early warning indicator.

Step 3:

Working Process of the Early Warning Indicator:

This part mainly performs an early warning alarm after the force analysis of the bridge. There are early warning indicators at the entrances of both ends of the bridge and on both sides of each section of the road. A structure of the early warning indicator is as shown in FIG. 8, which is composed of a capacitor, an early warning indicator, and an intelligent pebble. The intelligent pebble in this structure collects radio frequency signals and converts them into electrical energy and stores them in the capacitor, and the intelligent pebble performs energy collection when it is detected that the electric capacity of the capacitor is lower than a certain storage capacity, otherwise, it enters a dormant state.

Support early warning: first, intelligent pebble nodes at both ends of the same support carry out force collection, and determine whether the load bearing is overloaded by comparing the collected force and the pressure that the support can withstand; if the force is overloaded, an overload warning will be uploaded to a management terminal, and meanwhile the early warning indicators at both ends of the support will turn yellow; if the force continues to be overloaded, the early warning indicator will turn red, and the data will be uploaded to the management terminal for processing; if the other supports are balanced (within a normal range), the green light will be on.

Road early warning: data on the same section of road is detected, if there is an overload on one side of the road or in a certain area, the early warning indicators at both ends of the road will turn yellow, and if the force continues to be overloaded, the early warning indicators will turn red, and the data will be uploaded to the management terminal for processing.

Early warning at both ends of the bridge: if a certain section of the support or road network has a continuous force overload, the early warning indicators at both ends of the bridge will turn red, and according to the early warning lights, the driver can know that the bridge is overloaded and then prohibit driving into the bridge, so as to avoid the danger of bridge damage caused by force overload.

Prediction of the use of the bridge: the data uploaded by each support network and road network are saved, and analyzed with big data technology, to obtain a diagram of force changes of the bridge, which can predict the service life of the bridge. In this way, dangerous accidents caused by bridges that have exceeded their service life can be prevented in advance.

In the present invention, the method of using intelligent pebble network to monitor the force balance of a building in real time can monitor the force status and safety status of the building in real time. According to the collected force information, it is determined whether the current building is in a normal safe status. If the force is unbalanced, that is, the side force is so large that it exceeds the bearing range, an alarm will be issued, and treatment will be made in time, as shown in FIG. 9. By using the intelligent pebble, the waste of energy and resources is reduced, and the life cycle of the sensor is increased. When this method is used in housing construction and bridge construction, it will greatly increase the safety of the building.

The foregoing is merely preferable detailed embodiments of the present invention, but the protection scope of the present invention is not limited to this. Any equivalent replacements or variations made by skilled persons who know well about this technical field according to the technical solution and inventive concept of the present invention within the technical scope disclosed by the present invention should be included in the protection scope of the present invention.

The invention claimed is:

1. A node data transmission method, comprising:
synchronously awakening two neighboring nodes by a time synchronization method; and
after the two neighboring nodes are time synchronized and awakened, determining by the node a data cache thereof, wherein,
if the data cache of the node is less than a threshold, the node acts as a parent node role to collect data without transmitting data, and calculates whether its remaining energy can collect data and make the data cache greater than the threshold, wherein,
if the remaining energy is not sufficient to be maintained until the data cache is greater than the threshold, calculate the next synchronization wake-up time of the node and its neighboring child node, enter the sleep state when its energy is exhausted, and wait for the next time synchronization wake-up;
if the remaining energy is sufficient to be maintained until the data cache is greater than the threshold, calculate the next synchronization wake-up time of the node and its neighboring parent node, and if the data cache becomes greater than the threshold during the wake-up, the node is converted to a child node role to transfer the collected data without collecting data, and enter the sleep state when its energy is exhausted, waiting for the next time synchronization wake-up;
the data cache of the node is greater than the threshold, the node acts as a child node role to transmit data without collecting data, and calculate whether its remaining energy can transmit data in the data cache until the data cache is less than the threshold, wherein,
if the remaining energy is not sufficient to be maintained until the data cache is less than the threshold, calculate the next synchronization wake-up time of the node and its neighboring parent node, and enter sleep state when its energy is exhausted, waiting for the next time synchronization wake-up;
if the remaining energy is sufficient to be maintained until the data cache is greater than the threshold, calculate the next synchronization wake-up time of the node and its neighboring child node, and if the data cache becomes less than the threshold during the wake-up, the node is converted to a parent node role to collect data without transmitting data, and enter the sleep state when its energy is exhausted, waiting for the next time synchronization wake-up.

2. The node data transmission method according to claim 1, wherein the time synchronization method is as follows: there are two situations between the neighboring parent and child node: one is a super-frame size of the child node is greater than a super-frame size of the parent node; the other is a super-frame size of the parent node is greater than a super-frame size of the child node, and an adjustment method is to change the super-frame size in one node while keeping the super-frame size in the other node unchanged, to achieve time synchronization between the two nodes.

3. The node data transmission method according to claim 1, wherein a role conversion method is as follows: the node that sends the data is the child node, and the node that receives the data sends the data from a first node to a third node; the first node must forward the data to a second node, and the second node stores the data in a buffer, and then the second node transfers the data to the third node; as a continuous message flow, the data can only be transferred to one node at a time; the second node has two different roles during data transfer, the parent node and the child node;

at first, the second node is the parent node, which receives the data packet sent by the first node as the child node; then, the second node switches its role to the child node, and forwards the data packet to the third node acting as the parent node role;

during the above process, the second node conducts a role change, playing one of the two roles at different times according to specific conditions, and the role that the second node currently needs to play is determined according to the buffer size of the second node; when the buffer space in the second node is idle and can accept data from other nodes, the second node acts as the parent node role and receives data transmitted by its child node;

when the buffer of the second node is full and cannot accept more data packets, the second node acts as the child node role, and the second node as the child node sends data to the parent node to free up the buffer space.

* * * * *